May 15, 1962   O. GOEPEL   3,034,399
CONTINUOUS FILM FEED
Filed July 2, 1959   2 Sheets-Sheet 2
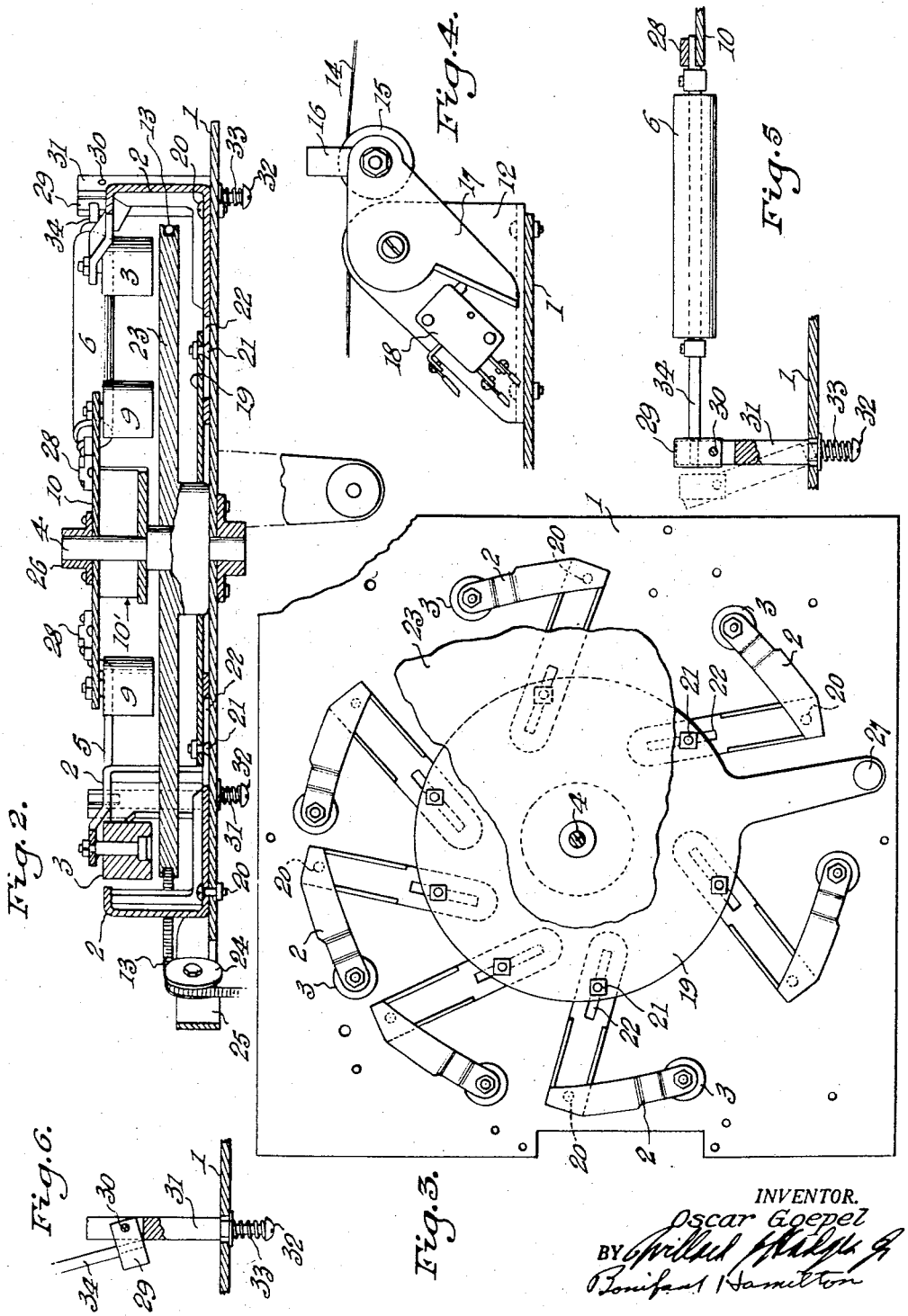
INVENTOR.
Oscar Goepel
ATTORNEYS

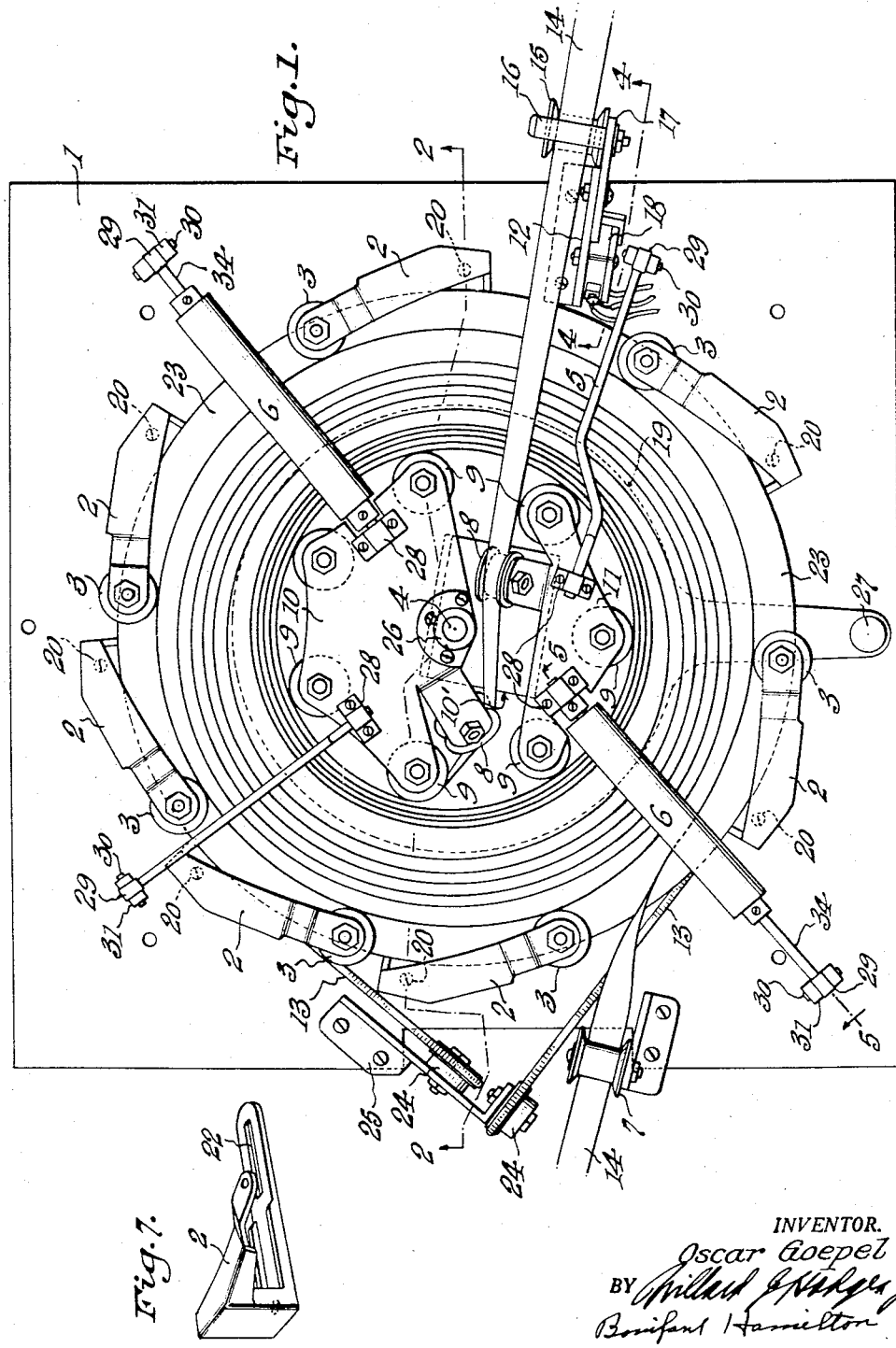

United States Patent Office 3,034,399
Patented May 15, 1962

3,034,399
CONTINUOUS FILM FEED
Oscar Goepel, Alexandria, Va., assignor to the United States of America as represented by the Secretary of the Army
Filed July 2, 1959, Ser. No. 824,758
2 Claims. (Cl. 88—18.7)
(Granted under Title 35, U.S. Code (1952), sec. 266)

The invention described herein may be manufactured and used by or for the Government for governmental purposes without the payment of any royalty thereon.

This invention relates to an improved rewind for a continuous film feed for movie projection.

The use of the automatic motion picture projector has greatly increased in recent years. Its use in displays and other informal viewing areas requires daily film wear of hours on end without the services of an operator. Such continuous showing is very demanding on the life of a film. It is subject to heat expansion, twisting and the other stresses and strains of constant use. A common cause of breakage occurs when the machine is started for a day's run after having been run the day before. Upon shutdown the day before, the film cools and contracts. This causes buckling of the roll of film on the rewind reel and elsewhere. The roll becomes gapped at various undesired places, and the film has a tendency to curl. The result is uncommon stress upon start-up due to the buckling, etc., causing the film to break. Consequently, upon restarting the projector for a new day's run, the film has to be run through slowly and under surveillance for at least one time until the film warms up and the kinks can be taken out.

The general object of this invention is to provide an improved rewind for a continuous film feed which materially increases film life and reduces breakage.

Another object of the invention is to utilize a horizontal turn table the structure of which effectively neutralizes the difference in film speed due to coil diameter.

Another object of the invention is to provide a tension adjustment paddle cooperating with tension arms to insure proper tension of the film while on the rewind reel.

The above and other advantages and objects of the invention may be found in the following detailed description, together with the accompanying drawings.

In the drawings:

FIG. 1 is a top plan view of the subject invention;

FIG. 2 is a vertical section taken substantially on line 2—2 of FIG. 1;

FIG. 3 is a plan view of the tension paddle and cooperating arms;

FIG. 4 is a side elevation partly in section of the safety switch details taken substantially on line 4—4 of FIG. 1;

FIG. 5 is a vertical section taken substantially on line 5—5 of FIG. 1;

FIG. 6 is a detailed side elevation partly in section of the hinged support for the roller and film guard assembly; and FIG. 7 is a perspective view of one of the tension adjustment arms.

Looking now with more particularity at FIG. 1, it is seen that 1 is a base plate which supports the structure relative to the instant invention. This base plate 1 is preferably made of aluminum or other light weight metal. It is to be understood that the instant invention is adaptable to automatic motion picture projectors now on the market. A base plate of light weight metal therefore is preferred as it is not likely to cause undue strain through weight on existing apparatus not designed for it. Carried upon base plate 1 through means of shaft 4 is a horizontal turn table 23, supported in suitable bearings and balanced. Shaft 4 is journalled at its top fitting into bearing 26 and at the lower end into bearing 26'. Bearing 26 fixedly secured to shaft 4 has a peripheral flange which supports plate 10. One leg of a channel 10' is secured to the plate 10 and the other leg supports the plate 11. Take off spools 8 carried by plates 10 and 11 at the proper angles carry the film 14 away from the inner periphery. A series of rollers 9 suspend from plates 10 and 11 forming the inner roller assembly. From the spools 8 the film 14 feeds to the main feed spool assembly which comprises main feed spool 15, a spool guard 16, a treadle 17 and a safety switch 18, the treadle and safety switch being mounted on a bracket 12 secured to base 1. The details of this assembly, the operation of which will be hereinafter described, are best illustrated in FIG. 4. The film 14 returns to the turn table 23 by means of return spool 7. It coils upon turn table 23 being guided overhead by horizontal rollers 6 and horizontal film guides 5. The rollers 6 and guides 5 are supported at one end by plates 10 and 11 through bearings 28 and at the other ends thereof by the base plate 1 through bearings 29 into which is fitted the axle 34 of roller 6 or guide 5. Bearings 29 are hingedly connected to the bifurcated upper end of support 31 by means of hinge pin 30. Support 31 in turn is hingedly supported on plate 1 through the action of a bolt and washer combination 32 interacting with spring 33 whereby support 31, provided with a reduced diameter at the point where it fits through plate 1, may be pulled at an angle away from the normal with respect to plate 1. This allows removal of the roller 6 or guides 5 from supports 28, by sliding the journalled portion of axle 34 out of bearings 28, permitting axle 34 to be rotated around hinge pin 30 to allow loading or unloading of the film 14. These details and mode of operation are best illustrated in FIGS. 5 and 6. The turn table 23 is driven by the coil spring drive belt 13 on the rear of the existing projector. This drive belt is guided and aligned by pulleys 24 which are supported on base plate 1 through means of bracket 25.

To maintain proper tension on the film and keep it coiled on the turn table, seven tension adjustment arms 2 are provided. FIG. 7 shows one of these arms in perspective showing a longitudinal slot 22. FIG. 3 shows all seven of the arms and their relation to the tension adjustment paddle 19, which latter is rotatable about shaft 4. Projections or studs 21 are affixed on paddle 19 and ride in the slots 22. In turn the arms 2 are pivotally connected at 20 on the base plate 1. Movement of the paddle 19 by means of manually operative paddle handle 27 causes the arms 2 to pivot inwardly or outwardly whereby the tension adjustment rollers 3 affixed on the ends of arms 2 are made to ride against the film 14 with the desired pressure.

The operation of the instant invention is as follows. The film 14 is fed into the system at return spool 7. Rollers 6 and guides 5 are disconnected and pivoted about their axes at 30 initially to allow the film to be coiled around turn table 23. The turn table is driven by the projector motor thereby assuring that the speed of the table and the speed of the film being projected is the same. As the film enters the turn table it is guided and maintained in a flat, coiled position by the horizontal film rollers 6 and kept from falling out of place on the turn table by the film guides 5. The film is now coiled onto the turn table around the inner roller assembly. As the turn table revolves around the inner roller assembly, it draws the used film from the projector and feeds it into a smaller coil around the rollers 9 on the inner assembly and from there to the take off spools 8. At this point the film is being drawn from the inner roller assembly by the projector, rather than being fed from the turn table. As the film leaves the spools 8, it is twisted into a flat position and is drawn to the main feed spool 15. At this point, if too much tension has built up on the turn table, the pressure of the film will cause the treadle 17 to pivot against the switch 18 thereby cutting off the projector motor and stopping the entire operation. On the other hand if the film builds up too much slack at this point, the main feed spool guard 16 will maintain the film on the spool. Proper tension is maintained of course by manual adjustment of the paddle wheel as previously described. This adjustment is varied as the film expands through heat or contracts after nonuse for a time. For example, after the film sits idly overnight, it will have a tendency to curl and lose its symmetrical coiled appearance. Starting up such a cold film very often leads to breakage if proper tension is not maintained and if no flexibilty is inherent in the structure of the rewind.

It is this ability of the instant invention to adapt to the varying circumstances caused by the film's differing lengths or thicknesses caused by heat and sometimes by foreign matter which marks it as an outstanding contribution in the field.

It will be noted that when the system is in operation, a slight gap is evident between the coiled film on the turn table's outer periphery and the film near the inner roller assembly. This gap is the result in part of the greater speed of the film at the outer periphery of the turn table, resulting in the outer coil being overdriven with respect to the projector speed. The gap is the neutral point in speed so to speak between the outermost coil and the innermost coil. The innermost coil is helped along in part by the projector drawing the film. Thus this gap is inherent partly because of the greater speed of revolving on the outer part of the turn table, partly because of the added impetus of the projector drawing the film, and partly because of the tension adjustments which are made initially through the paddle which effectively controls the amount of gapping and smooth take off operation.

Thus in this system if the film increases in length this excess is taken up in the larger outer coil by transferring from the inner coil, thereby maintaining a constant feed to the projector. If the film length decreases it is automatically transferred to the inner coil which again results in maintaining a constant feed.

While the foregoing disclosure is directed to the problem of handling film reels it is obvious that the same principle may be applied to the handling of other kinds of tape. It will also be apparent to those skilled in the art that various changes, substitutions and other departures from this disclosure may be made within the spirit and scope of the appended claims.

I claim:

1. A continuous film feed apparatus comprising a projector having endless film supplied by a film roll, a base, a shaft carried by said base and a horizontal turn table supported on said shaft and carrying said film roll, drive means for said projector and means connecting said drive means for said projector to said turn table, a film return spool supported by said base for returning film from said projector to the outside of said film roll, an inner roller assembly including a plurality of rollers and take off spools, said plurality of rollers suspended above said turn table by mounting means carried by said shaft and forming an inner periphery around the hub of said turn table, said take off spools cooperating with said plurality of rollers, a main film feed spool assembly for feeding film from the inside of said film roll into said projector supported on said base including a feed spool and safety switch means for controlling said drive means, a plurality of adjustable tensioning means located externally of said inner roller assembly and pivotally connected to said base, support means rotatable about said shaft including means for adjustably interconnecting said plurality of adjustable tensioning means to said support means for simultaneously moving said adjustable tensioning means selectively toward and away from said shaft whereby the speed of the film at the return spool relative to the speed of the film at the feed spool is maintained constant.

2. The film feed apparatus as claimed in claim 1 wherein the adjustable tensioning means comprise a circular paddle juxtaposed beneath said turn table, said paddle being centrally pivoted at said shaft, a paddle handle extending beyond the circumference of said turn table, a plurality of studs on a paddle surface spaced at equal radial distances, said studs extending normally to the plane of said paddle surface, a plurality of substantially L-shaped arms pivotally secured to said base at the elbow, each arm having a longitudinal slot at one end, the said studs riding in said longitudinal slots, and a free roller at the other end of each arm adapted to ride against the perimeter of the outer coil of film on said turn table, whereby movement of said paddle handle causes said free rollers to move in a concentric pattern with respect to said film coil.

References Cited in the file of this patent

UNITED STATES PATENTS

| | | |
|---|---|---|
| 994,044 | Uebelmesser | May 30, 1911 |
| 2,255,724 | Sunell | Sept. 9, 1941 |
| 2,363,403 | De Napoli | Nov. 21, 1944 |
| 2,443,248 | Hurley | June 15, 1948 |
| 2,846,219 | Matheson | Aug. 5, 1958 |